Jan. 5, 1932.  W. STEUBLE  1,839,355
DRIVING MECHANISM FOR LONG STROKE CANADIAN PUMPS OF OIL WELL RIGS
Filed Nov. 24, 1930
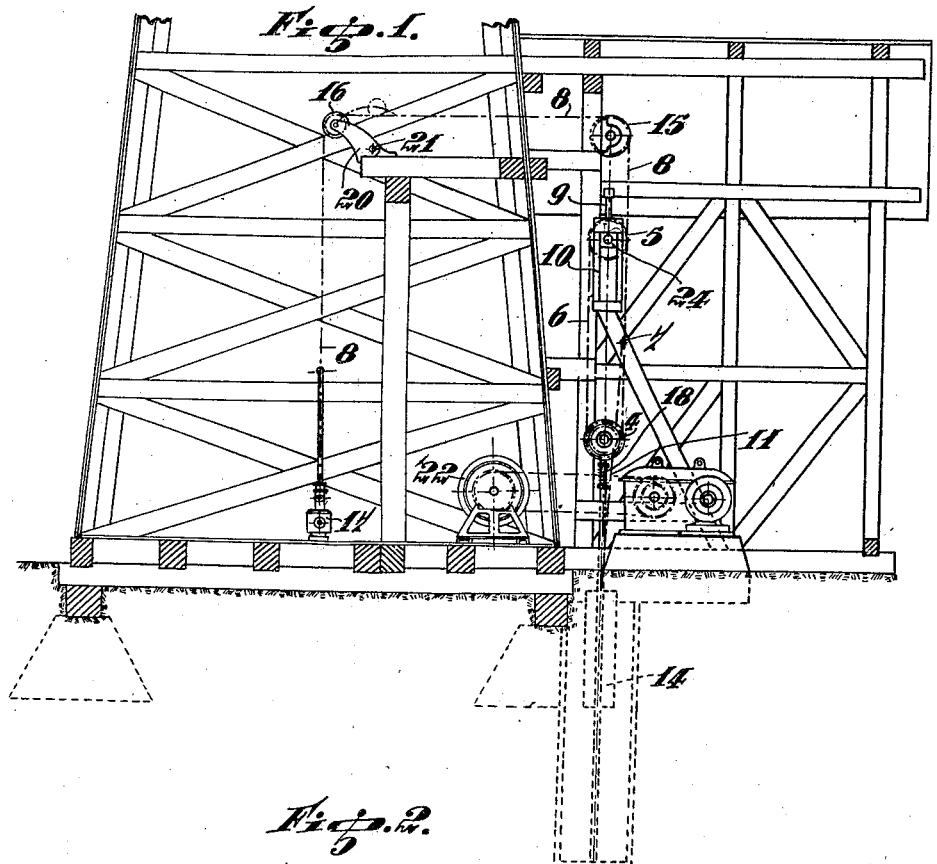
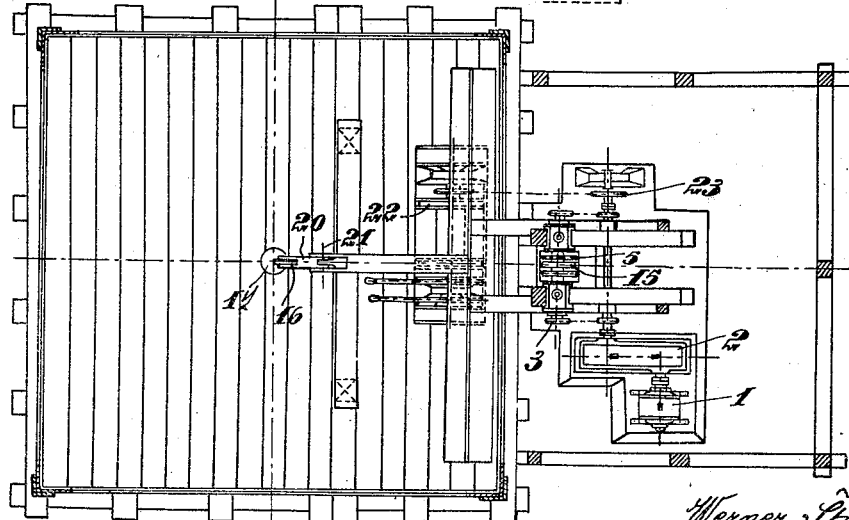
Inventor.
Werner Steuble.
per: J. Levers
Attorney.

Patented Jan. 5, 1932

1,839,355

UNITED STATES PATENT OFFICE

WERNER STEUBLE, OF CAMPINA, PRAHOVA, RUMANIA, ASSIGNOR TO "CONCORDIA" SOCIETATE ANONIMA ROMANA PENTRU INDUSTRIA PETROLULUI, OF PLOESTI, RUMANIA

DRIVING MECHANISM FOR LONG STROKE CANADIAN PUMPS OF OIL WELL RIGS

Application filed November 24, 1930. Serial No. 497,867.

The present invention relates to a driving mechanism for long stroke Canadian pumps of oil-wells, which will advantageously replace the beams and cranks in lever actuated pumps of oil-wells.

The improved driving mechanism comprises in combination: an endless chain engaging chain wheels adapted in the oil-well rig in a substantially vertical plane, said chain wheels being driven by a motor and appropriate transmission means. A point of the endless chain is connected by means of a cable to the piston rod of the pump, the arrangement being such that said connecting cable will reciprocate in a plane substantially parallel to that of the endless chain. Said connecting cable is conveniently guided over pulleys and this cable is further connected to a spring-controlled weight used to accumulate power during one stroke, said power being restituted in the other stroke.

In a preferred form of embodiment, the driving mechanism will comprise two pairs of shaft end supported chain wheels of uniform diameter, arranged in parallel vertical planes so as to provide a free vertical intermediate passage. Each pair of chain wheels will be engaged by an endless chain, and a transverse bar will connect both chains. Said bar is connected to the piston rod by means of a cable passing over guide pulleys. The four shaft ends supporting the chain wheels will be in a common vertical plane, the upper wheels being adjustable with respect to the lower, so as to make it possible to vary the stroke of the piston of the pump.

The invention will be described hereafter with reference to the accompanying drawings:

Fig. 1 is an elevation, partly in section, of the oil-well rig comprising the driving mechanism for the pump;

Fig. 2 is a plan view.

With reference to these drawings, the driving mechanism comprises a motor 1 driving the chain wheels 3 by means of the speed reducing transmission gear 2. The chain wheels 3 drive the chain wheels 4 which are engaged by the endless chains 6 passing over the upper chain wheels 5. The chain wheels 4 and 5 are shaft end supported in parallel vertical planes, the four shafts being preferably in a common vertical plane, so that the free space remains between the chain wheels and the endless chains. The endless chains 6 are connected by a transverse bar 7. The piston rod of the pump is connected to said bar 7 by means of a cable 8 passing over guide pulleys 15, 16.

The bearings 24 of the upper chain wheels 5 are movable with respect to the wheels 4, said bearings being slidably adapted in a guide 10, so as to make it possible to vary the stroke of the piston in the pump. The sliding movement of the bearing 24 is operated by screws 9.

It is obvious that the adjustment of the wheels 5 will require a shortening or lengthening of the endless chains.

The guide pulleys 15, 16 are conveniently journalled in the rig structure and pulley 16 is mounted in the swivelling support 20 pivoted in 21 to the structure.

To the transverse bar 7 is also connected a cable 11, supporting at its free end a weight 14, which moves inside an excavation eventually guided along a vertical post. The weight 14 is controlled by a spring 18, the free end of which abuts against the fixed part of the structure. Said spring 18 is compressed by the upward movement of the weight 14 during one stroke of the pump, so as to accumulate power which will be restituted during the other stroke.

The driving mechanism operates as follows:

The rotation of the motor 1 is transmitted to the wheels 3 by means of the speed reducing gear 2. Said chain wheels 3 transmit their movement to the chain wheels 4, which drive the endless chains 6 at a uniform speed and in the same direction. The endless chains will communicate the reciprocating movement to the cable 8, the end of which is connected to the transverse bar 7 and said reciprocating movement is transmitted to the piston rod 17. The downward stroke of the piston rod 17 brings the spring 18 under tension and this accumulated power is restituted during the upward stroke of the piston, so that the driving mechanism will operate in a regular and supple manner. The guide pulley 16 adapted in a swivelling support 20 can be swivelled aside, so as to liberate the well and allow working with the muffle.

The plant further comprises an extraction winch 22, driven in a convenient manner by the wheel 23.

This driving mechanism will afford considerable advantage over the apparatus generally used for driving such pumps. As understood, the stroke of the pump can be modified, so that it is possible to effect the maximum required stroke, which presently attains 4 meters and more. Such long piston strokes will allow a reduced speed for the pump, such reduced speed being efficient to avoid obstruction of the pump by sand.

The mechanism does not comprise reciprocating masses, as all the elements of the drive have a continuous uniform movement in one direction.

No loss occurs by acceleration or speed reduction of the driving masses.

The action of the mass of the piston rods is reduced by the action of the springs and weight, these elements balancing for instance the weight of the piston and its rod. The traction upon the piston rods is operated in a vertical path, so that lateral pressure on the stuffing boxes is avoided.

The variation of the stroke is an easy operation and the possibility of putting the guide pulley 16 aside, allows a cleaning of the well without complicated dismounting of the apparatus.

The balancing effect of the spring and weight avoids shocks during the working. It must be observed that the spring or springs are tensioned to a maximum at dead center, so that restitution of the accumulated power occurs at the return stroke of the pistons, when it is obviously required to have a considerable impulsive effort, whereby the driving mechanism will operate silently and have a considerable output, as no loss of power occurs by the wear caused by reciprocating mechanisms.

Furthermore, the downward stroke of the piston rod allows accumulation of power immediately restituted during the return stroke.

I claim:

A driving mechanism for long stroke Canadian pumps comprising two pairs of shaft end supported chain wheels, the shafts being arranged in a common vertical plane, said chain wheels being of uniform diameter and arranged in parallel vertical planes within the oil-well rig so as to provide a free intermediate passage, the upper chain wheels being journalled in adjustable bearings, a transverse bar connecting both chains, a cable connecting the piston rod of the pump with said transverse bar, overhead guide pulleys for said cable, a second cable connecting the transverse bar and a spring-controlled weight arranged to assist the upward movement of the piston pump, a motor and transmission means to drive each of the lower chain wheels at a uniform speed in the same direction.

In testimony whereof I signed hereunto my name.

WERNER STEUBLE.